United States Patent
Ta et al.

(10) Patent No.: US 7,187,154 B2
(45) Date of Patent: Mar. 6, 2007

(54) MOTOR DRIVE APPARATUS AND ELECTRIC POWER STEERING APPARATUS

(75) Inventors: CaoMinh Ta, Gunma (JP); Shuji Endo, Gunma (JP); Hideyuki Kobayashi, Gunma (JP); Masahide Saito, Gunma (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 0 days.

(21) Appl. No.: 11/115,369

(22) Filed: Apr. 27, 2005

(65) Prior Publication Data

US 2005/0242765 A1    Nov. 3, 2005

(30) Foreign Application Priority Data

Apr. 28, 2004  (JP)  ............................. 2004-133811

(51) Int. Cl.
*H02P 23/00* (2006.01)
*H02P 25/00* (2006.01)
*H02P 27/00* (2006.01)

(52) U.S. Cl. ...................... 318/799; 318/432; 318/434; 318/632; 318/700

(58) Field of Classification Search ................ 318/138, 318/254, 439, 700
See application file for complete search history.

(56) References Cited

U.S. PATENT DOCUMENTS

| | | | | |
|---|---|---|---|---|
| 5,841,252 A | * | 11/1998 | Dunfield | ..................... 318/254 |
| 5,998,946 A | * | 12/1999 | Kim | ........................... 318/254 |
| 6,163,119 A | * | 12/2000 | Jeong | ......................... 318/254 |
| 6,163,127 A | * | 12/2000 | Patel et al. | ................. 318/700 |
| 6,184,636 B1 | | 2/2001 | Lewis et al. | |
| 6,750,626 B2 | * | 6/2004 | Leonardi et al. | ............ 318/602 |

FOREIGN PATENT DOCUMENTS

| EP | 1 139 557 A1 | 10/2001 |
|---|---|---|
| JP | 2001-18822 A | 1/2001 |
| JP | 2001-204189 A | 7/2001 |

* cited by examiner

*Primary Examiner*—Lincoln Donovan
*Assistant Examiner*—Erick Glass
(74) *Attorney, Agent, or Firm*—Sughrue Mion, PLLC

(57) ABSTRACT

The present invention provides a motor drive apparatus capable of calculating an angular velocity and a rotation angle accurately in the entire rotation velocity range of a motor using a cheap Hall sensor having an inferior accuracy without using an expensive resolver having a high accuracy. The present invention includes a first angular velocity calculating means for calculating the angular velocity based on the back-EMF of the motor when it rotates at low speeds and a second angular velocity calculating means for calculating the angular velocity based on a signal from the Hall sensor when it rotates at high speeds. According to the present invention, the angular velocity and rotation angle can be calculated accurately in the entire rotation speed range using the Hall sensor under hybrid usage.

7 Claims, 10 Drawing Sheets

MOTOR DRIVE APPARATUS AND ELECTRIC POWER STEERING APPARATUS

BACKGROUND OF THE INVENTION

1. Technical Field

The present invention relates to a motor drive apparatus and an electric power steering apparatus using the same, and particularly to a motor drive apparatus capable of detecting an angular velocity of the motor accurately both at the times of high speed rotation and low speed rotation and to an electric power steering apparatus provided with the motor apparatus.

2. Prior Art

In the electric power steering apparatus which provides an automobile steering apparatus with steering assist force with a rotation force of the motor, a drive force of the motor is provided to a steering shaft or a rack shaft with a transmission mechanism such as gears or belt through reduction gears as the steering assist force. A simple structure of such an electric power steering apparatus will be described with reference to FIG. 1. A shaft 102 of a steering handle 101 is connected to a tie rod 106 of steered wheels through reduction gears 103, universal joints 104a, 104b and a pinion rack mechanism 105. The shaft 102 is provided with a torque sensor 107 for detecting a steering torque of the steering handle 101 and a motor 108 for assisting the steering force of the steering handle 101 is connected to the shaft 102 through the reduction gears 103.

The motor 108 of the electric power steering apparatus having such a structure needs to execute control properly so as to output a desired torque corresponding to an operation of the steering handle by a vehicle driver. A vector control, which is one of the typical control methods for controlling the motor 108 of the electric power steering apparatus has been described in Japanese Patent Application Laid-open No.2001-18822 A, and FIG. 2 is a block diagram showing the control apparatus of the electric power steering apparatus disclosed in the patent document.

If explaining the control block, a torque command value Tref calculated by a torque command value calculating section (not shown), a rotation angle θ which is an electric angle of the motor 108 and an angular velocity ω are inputted to a current command value calculating section 204 based on a steering torque Tr detected by the torque sensor 107. Although the current command value calculating section 204 calculates a current command value Iqref of q-axis component and a current command value Idref which is d-axis component, usually, the current command value Iqref is proportional to a torque command value Tref and the current command value Idref is "0" (usually, Idref=0). On the other hand, an angle detector for detecting a rotation angle θ and an angular velocity ω of the motor 108 is provided and although an encoder and a Hall sensor are available as an angle detector, a resolver 201 is used here. Since a signal outputted from the resolver 201 does not indicate digital rotation angle θ, the digital rotation angle θ and the digital angular velocity ω are calculated by a position detecting circuit 202 which is constituted of an RDC (resolver/digital converter) circuit.

This control block diagram uses feedback control as an example and it is necessary to detect actual motor currents Ia, Ib, Ic of the motor 108 for the aforementioned current command values Iqref and Idref and execute feedback control. More specifically, in current detectors 205-1, 205-2, the motor currents Ia and Ic are detected and the motor current Ib is calculated as "Ib=−(Ia+Ic)" by a subtracting section 207-3 from the relation of "Ia+Ib+Ic=0". Next, for the vector control, it is converted in to motor currents Iq and Id by a 3-phase/2-phase converting section 206. Forth is conversion, the rotation angle θ of the motor 108 is used. Next, the motor currents Iq and Id are respectively fed back to the subtracting sections 207-1 and 207-2 and the subtracting section 207-1 calculates a deviation ΔIq between the current command value Iqref and a motor current Iq and the subtracting section 207-2 calculates a deviation ΔId between the current command value Idref (usually Idref=0) and the motor current Id.

Input is made into a proportional-integral (PI) control section 208 in order to eliminate the above deviations and voltage command values Vdref and Vqref are outputted. Because the actual motor 108 needs to be supplied with 3-phase current, the voltage command values Vdref and Vqref are converted into voltage command values Varef, Vbref, Vcref of three phase by a 2-phase/3-phase converting section 209. A PWM control section 210 generates a PWM control signal based on the voltage command values Varef, Vbref, Vcref and an inverter circuit 211 supplies current to the motor 108 based on the PWM control signal and the motor currents Ia, Ib, Ic are supplied to eliminate the deviations of the current command values Iqref, Idref.

As described above, the angular velocity ω and the rotation angle θ of the rotor are important for the control of the motor and need to be detected accurately. Thus, although a resolver and encoder having a high accuracy are used as the position detecting sensor 11, there is such a problem that it is expensive.

Japanese Patent Application Laid-open No.2001-204189 A has disclosed a method in which the rotation angle θ of the rotor is detected using the voltage and current of the motor without using any position detecting sensor. However, although this method is capable of detecting the rotation angle θ of the rotor, there is such a problem that the angular velocity ω cannot be detected because this method is based on mainly integration.

As described above, to detect the angular velocity and rotation angle of the rotor accurately, an expensive sensor is needed or if no position detecting sensor is used, the angular velocity cannot be detected although the rotation velocity can be detected.

SUMMARY OF THE INVENTION

The present invention has been achieved in views of the above-described situation and an object of the present invention is to provide a motor drive apparatus capable of detecting an angular velocity and a rotation angle of the motor accurately using a cheap position detecting sensor when the motor rotates at low speeds as well as when the motor rotates at high speeds and an electric power steering apparatus provided with the motor drive apparatus.

The present invention concerns the motor drive apparatus and the above-described object of the present invention is achieved by comprising: a first angular velocity calculating means for calculating the angular velocity of a brushless motor using inverse-electromotive-voltage(hereinafter refer to "back-EMF") of the brushless motor; a second angular velocity calculating means for calculating the angular velocity of the brushless motor using signals of plural Hall sensors disposed in the brushless motor; and a selecting means which when the rotation velocity of the brushless motor is lower than a predetermined rotation speed, selects an angular velocity ω1 detected by the first angular velocity calculating means and when the rotation velocity of the brushless motor is higher than the predetermined rotation speed, selects a angular velocity ω2 detected by the second angular velocity calculating means. Further, the above-described object of the present invention is achieved effectively by the motor drive apparatus in which the first angular velocity calculating means detects the magnitude of the angular velocity ω1 using back-EMF calculated by voltage and current of the brushless motor. The above described object of the present invention is achieved effectively by the motor drive apparatus in which the second angular velocity calculating means calculates the angular velocity ω2 using the signal of the Hall sensor at the time of detection and the signal of plural Hall sensors before the detection time. The above-described object of the present invention is achieved effectively by the motor drive apparatus in which the selecting means selects the angular velocity ω1 or the angular velocity ω2 based on a predetermined rotation speed having hysteresis characteristic. The above-described object of the present invention is achieved effectively by the motor drive apparatus in which a rotation angle θ of the brushless motor is calculated based on the angular velocity ω1 and the angular velocity ω2. The above described object of the present invention is achieved effectively by an electric power steering apparatus provided with the motor drive apparatus.

DESCRIPTION OF THE PREFERRED EMBODIMENTS

The principle which enables the angular velocity and rotation angle to be calculated using back-EMFs and Hall sensor signal will be first described and then the embodiments will be described later.

Figure 3:
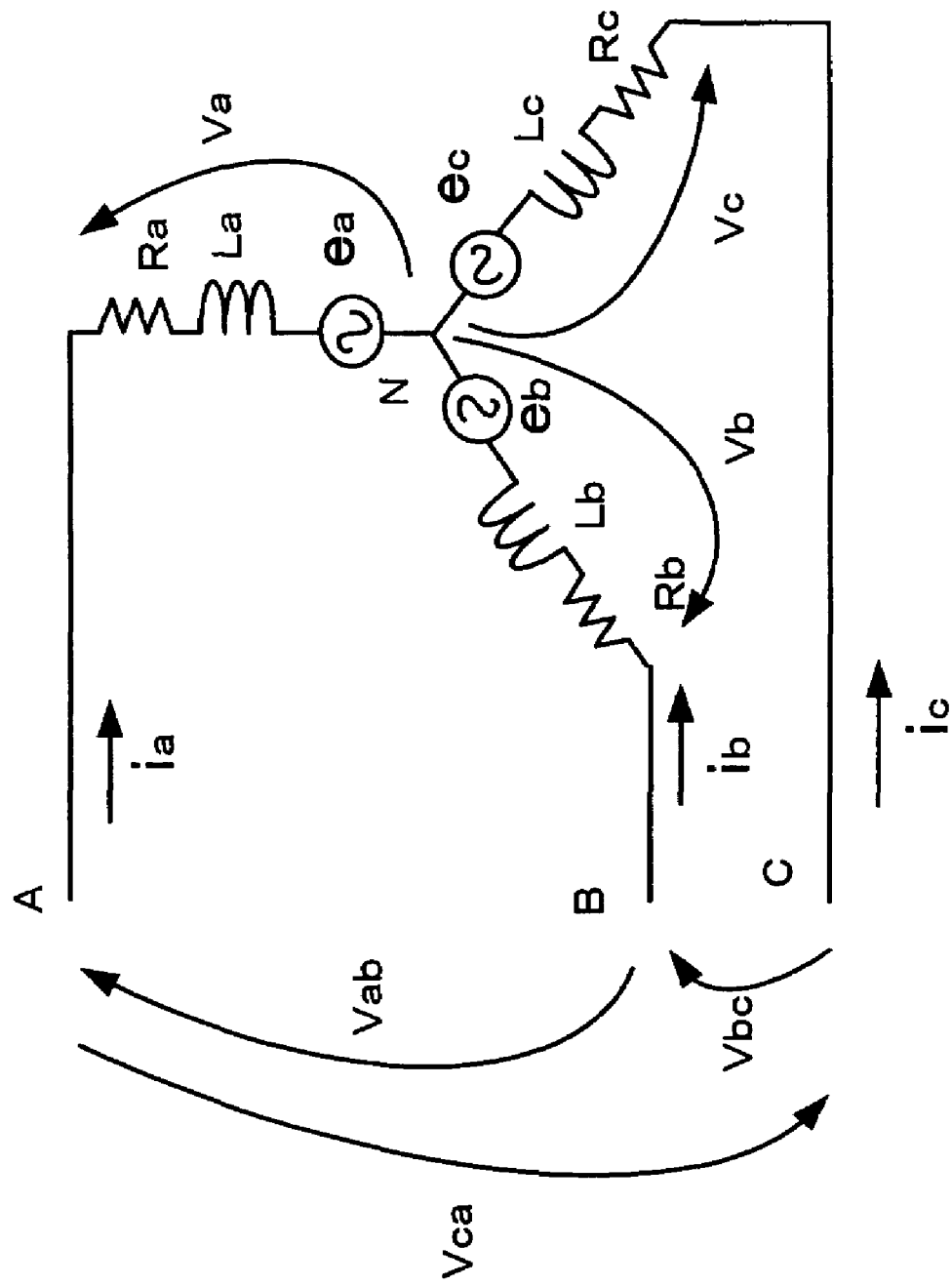
FIG. 3 is a diagram for explaining the principle for calculating the back-EMFs ea, eb, ec for using in calculation of the angular velocity ωe according to the present invention.

First, the principle for detecting the angular velocity using the back-EMF will be described with reference to FIG. 3.

Although, in the following explanation, an example for detecting phase voltages Va, Vb, Vc as the voltage of the motor will be described, this is valid even if the voltages are line voltages Vab, Vbc, Vca. As well as the voltage, motor currents ia, ib, ic are detectable and motor winding resistances Ra, Rb, Rc and inductances La, Lb, Lc, which are not detectable, can be obtained from the characteristic of the motor. The relation between these values and the respective back-EMFs ea, eb, ec of the motor can be expressed with the relations of the below numerical formula 1.

(Numerical formula 1)

$$ea = Va - (Ra + s \cdot La) \cdot ia$$

$$eb = Vb - (Rb + s \cdot Lb) \cdot ib$$

$$ec = Vc - (Rc + s \cdot Lc) \cdot ic$$

where "s" is the Laplace operator, indicating differential operation (d/dt).

Next, calculation of the angular velocity ωe of the rotor will be described. Hereinafter, the angular velocity ωe indicates an electric angular velocity unless noted specially. The relation between the electric angular velocity ωe and the mechanical angular velocity ωm is "ωe=P·ωm" if the pole-pair number of the motor is expressed as "P". Generally, the relation between the back-EMF "e" of the motor and the angular velocity ωe can be expressed with a numerical formula 2.

(Numerical formula 2)

$$e = Ke \cdot \omega m$$

where "Ke" is the back-EMF constant [V/rad/s] of the motor.

However, the above-mentioned numerical formula 2 is an equation for a brush motor and in case of a brushless motor having no rectifier, it is necessary to rectify the back-EMFs ea, eb, ec of respective phases. In trapezoidal wave current and rectangular wave current, rectifying means obtaining the maximum value. This can be expressed with a numerical formula 3.

(Numerical formula 3)

$$|\omega e| = 2 \times \{\max(|ea|, |eb|, |ec|)\} / Ke$$

Figure 4:
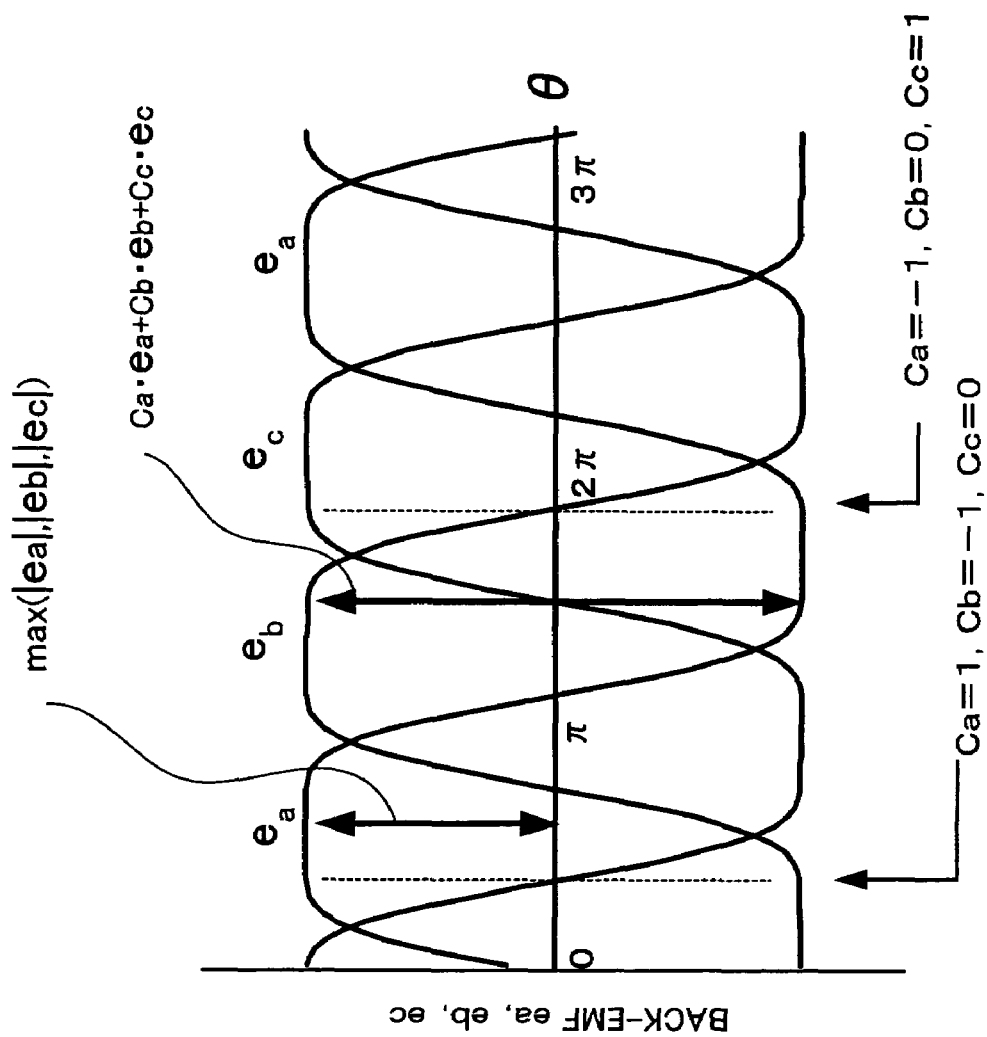
FIG. 4 is a diagram for explaining the principle for calculating the angular velocity ωe from the back-EMF ea, eb, ec according to the present invention.

Here, the waveforms of the back-EMFs ea, eb, ec are shown in FIG. 4. Rectifying means obtaining an envelope curve of the back-EMFs ea, eb, ec, that is, obtaining the maximum value. The reason why the numerator of the numerical formula 3 is doubled is that by obtaining the absolute values of the back-EMFs ea, eb, ec, the value of a negative side is superposed on a positive side.

Thus, the angular velocity ωe can be expressed with a numerical formula 4 by combining the level |ωe| of the angular velocity ωe of the numerical formula 3 and the rotation direction of the angular velocity which can be detected with a Hall sensor.

(Numerical formula 4)

$$\omega e = \{\text{sign}(\omega e)\} \cdot |\omega e|$$

where, sign(ωe) indicates a rotation direction of the angular velocity, and sign(ωe)=1 means clockwise (CW) rotation while sign(ωe)=−1 means counter-clockwise(CCW) rotation.

Although the principle for calculating the angular velocity ωe using the absolute value has been described, the angular velocity ωe can be calculated without using any absolute value if the Hall sensor signal is used. With reference to FIG. 4, the numerical formula 5 can be expressed with the back-EMFs ea, eb, ec and commutation signals Ca, Cb, Cc.

(Numerical formula 5)

$$\omega e = (Ca \cdot ea + Cb \cdot eb + Cc \cdot ec)/Ke$$

Here, the commutation signals Ca, Cb, Cc are parameters which express communication (rectification) and in case of the trapezoidal wave current and the rectangular wave current, the value "1", "0" or "−1" is obtained. Depending on an electric angle θo, a range in which the commutation signals Ca, Cb, Cc are "1", a range in which "0" and a range in which "−1" are determined and those ranges can be determined by a detection signal of the Hall sensor. The angular velocity ωe can be detected using any one of the numerical formulas 4 and 5 using the back-EMF.

In the meantime, when the angular velocity ωe is calculated using the back-EMF, there is such a problem that an error in the angular velocity detection increases under high speed rotation because a time lag due to a noise filter or an A/D converter when fetching in a current detection sensor signal exists.

Figure 5:
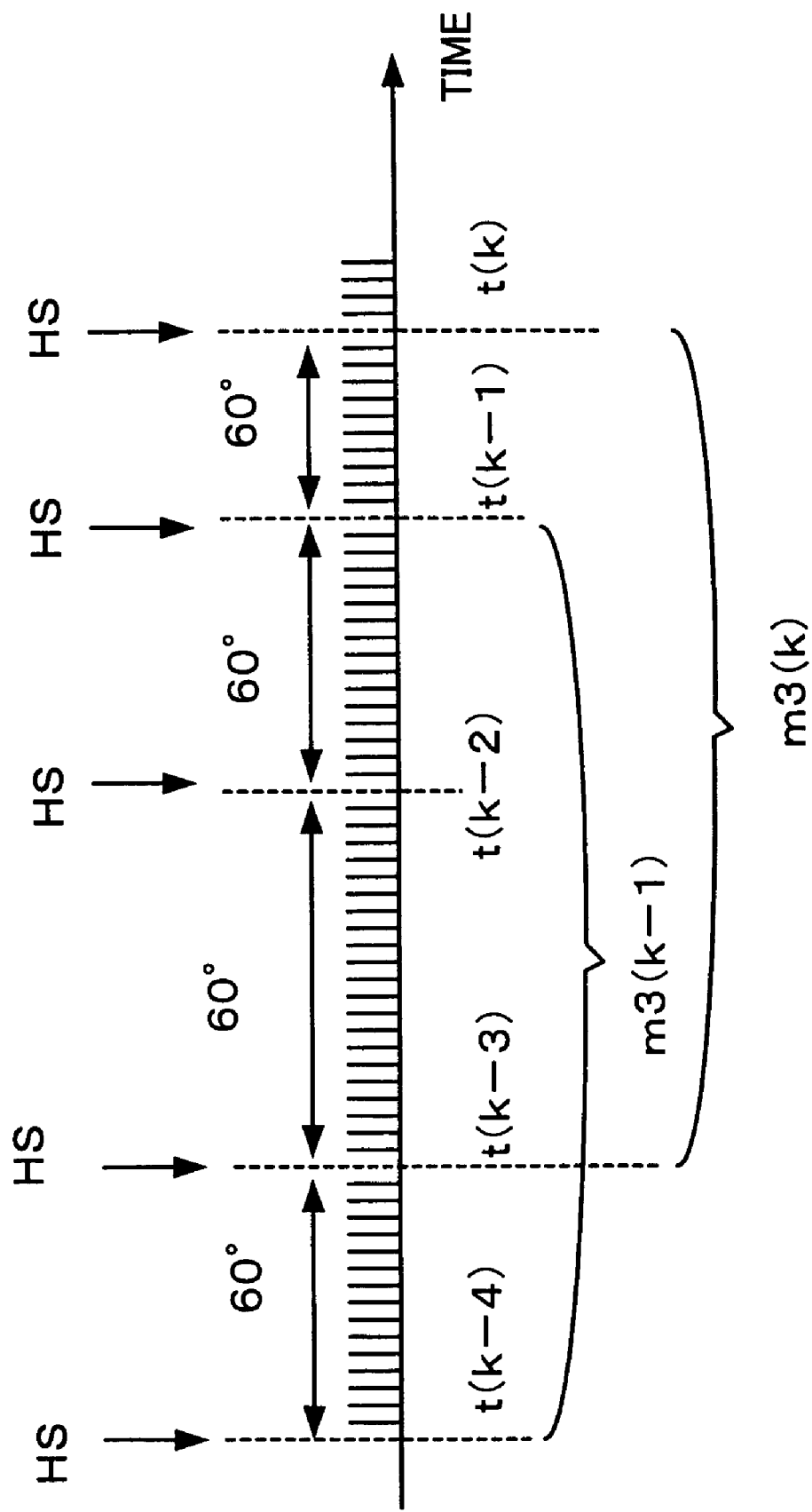
FIG. 5 is an explanatory diagram of the principle for calculating the angular velocity using four Hall sensor signals.

Next, the principle that the angular velocity ωe can be detected using the Hall sensor will be described with reference to FIG. 5. In case of three-phase brushless motor, three Hall sensors are disposed at every 120° around a rotor, for example, in the form of HS1, HS2, HS3. Thus, if the time taken to move in 120° interval (or 60° interval) from the Hall sensor HS1 to HS2 is measured using a sampling time, the angular velocity ωe can be detected. Thus, basically, the angular velocity ωe can be detected using a numerical formula 6.

(Numerical formula 6)

$$\omega e = (\pi/3)/(T(HSn) - T(HSn-1))$$

However, if the angular velocity is estimated from only an interval between adjoining Hall sensors, for example, the Hall sensor HS1 and the Hall sensor HS2, the error is increased. Thus, according to the present invention, by using plural previous Hall sensors by going back from a detection time as well as aHall sensor at the time of detection, the angular velocity ωe is estimated. For example, as shown in FIG. 5, the angular velocity ωe is estimated by using four Hall sensor signals outputted from three intervals from the detection time, that is, the three Hall sensors. That is, if the detection time point is "t(k)", Hall sensors at four points, time points t(k), t(k−1), t(k−2) and t(k−3) are used. Here, the Hall sensor signals at time points t(k) and t(k−3) mean the newest signal and a signal a single round ago, which are outputted from the same Hall sensor. By detecting an angle of this interval and number $m_3(k)$ of a sampling signal in this interval, the angular velocity is estimated. More specifically, the angular velocity ωe is expressed as the below numerical formula 7.

(Numerical formula 7)

$$\omega e = \pi/(m_3(k) \cdot Ts)$$

where, "Ts" indicates a sampling time.

In actual use, when previous four Hall sensor signals are used, coefficients "a, b" are obtained according to least squares method and the angular velocity ωe is estimated according to a numerical formula 8.

(Numerical formula 8)

$$\omega e = (\pi/3)/(a \cdot (T(HSn) - T(HSn-4)) + b \cdot (T(HSn-1) - T(HSn-3)) = (\pi/3)/(0.2(T(HSn) - T(HSn-4)) + 0.1(T(HSn-1) - T(HSn-3))$$

Next, the electric angle θ can be obtained using the angular velocity ωe according to a numerical formula 9.

(Numerical formula 9)

$$\theta = \theta i + \int \omega e \, dt$$

Here, "θi" is an initial value of an integration interval. If specific digital processing is assumed, the numerical formula 9 can be calculated as "θ=θi+n·ωe·Ts". In the meantime, by employing the Hall sensor signal as the initial value θi, an error of the rotation angle θ can be reset every 60°.

Due to the above theory or principle, embodiments of the present invention will be explained with reference to the accompanying drawings.

Embodiment-1

Figure 1:
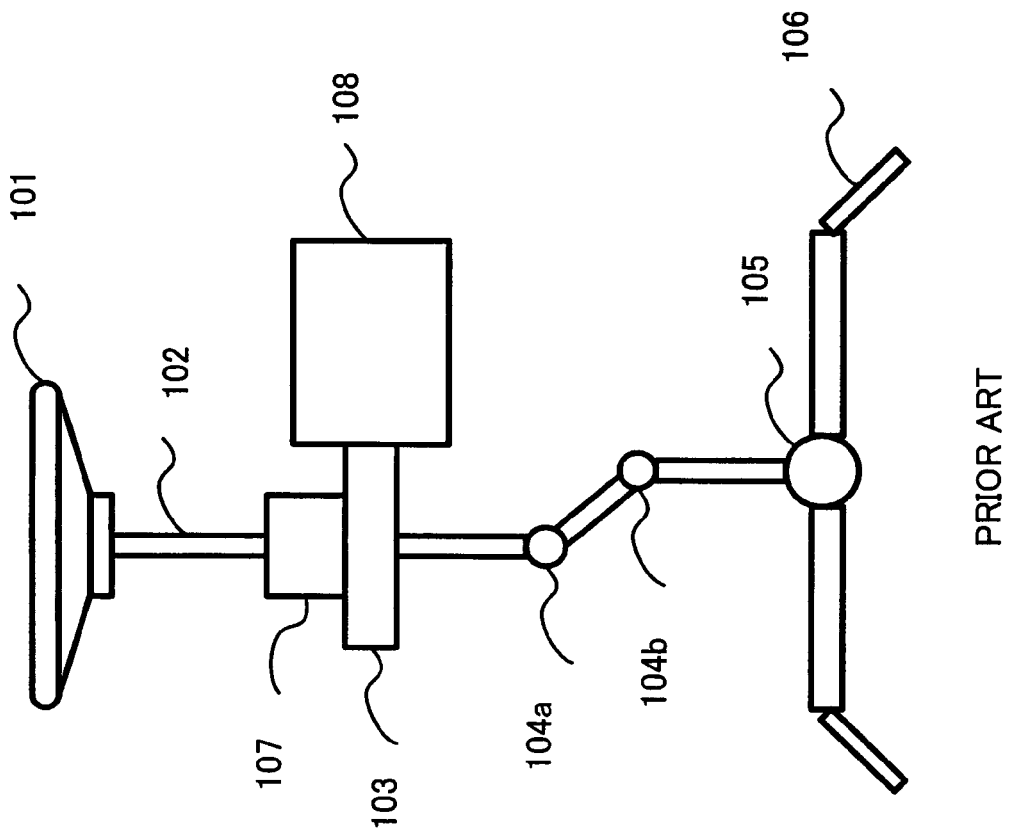
FIG. 1 is a structure diagram of a general electric power steering apparatus.
Figure 2:
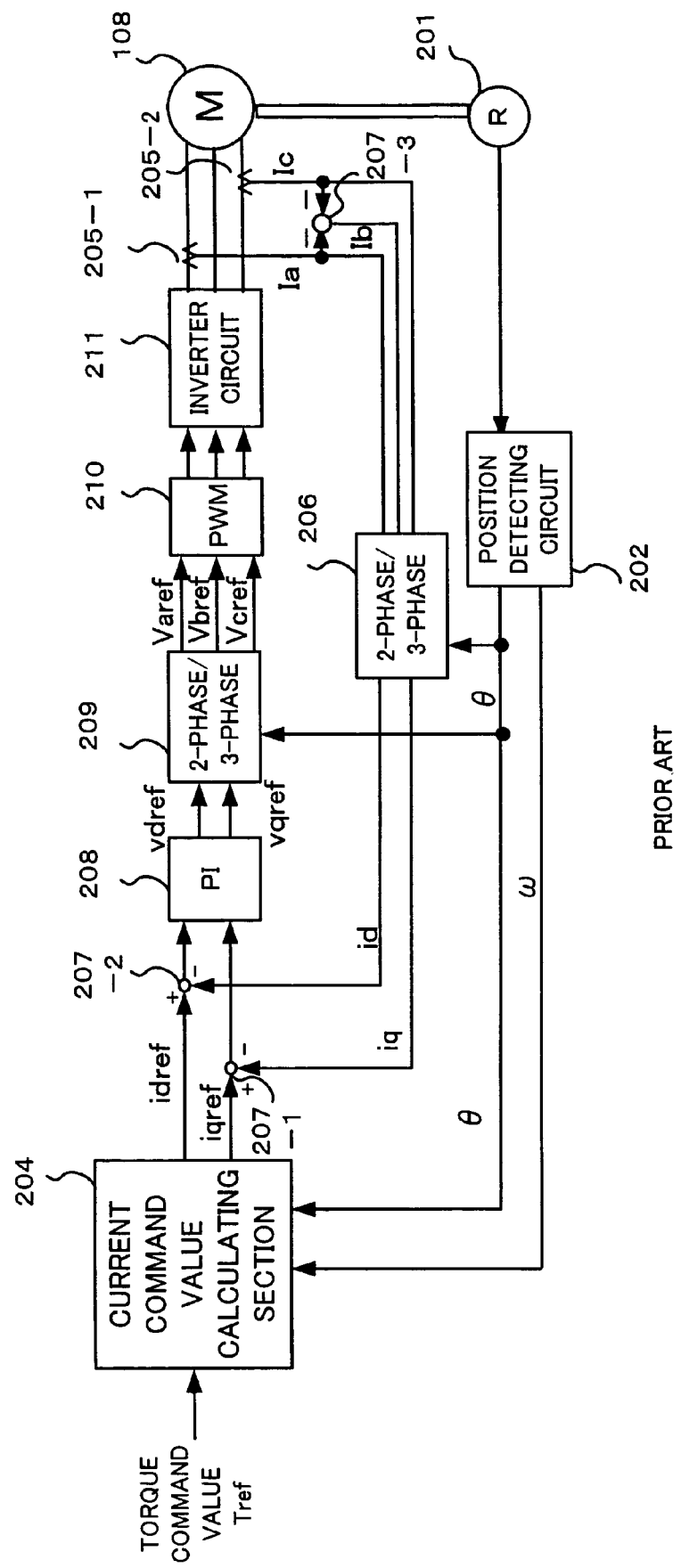
FIG. 2 is a block diagram showing a control device of a conventional electric power steering apparatus using an angular velocity detecting means.
Figure 6:
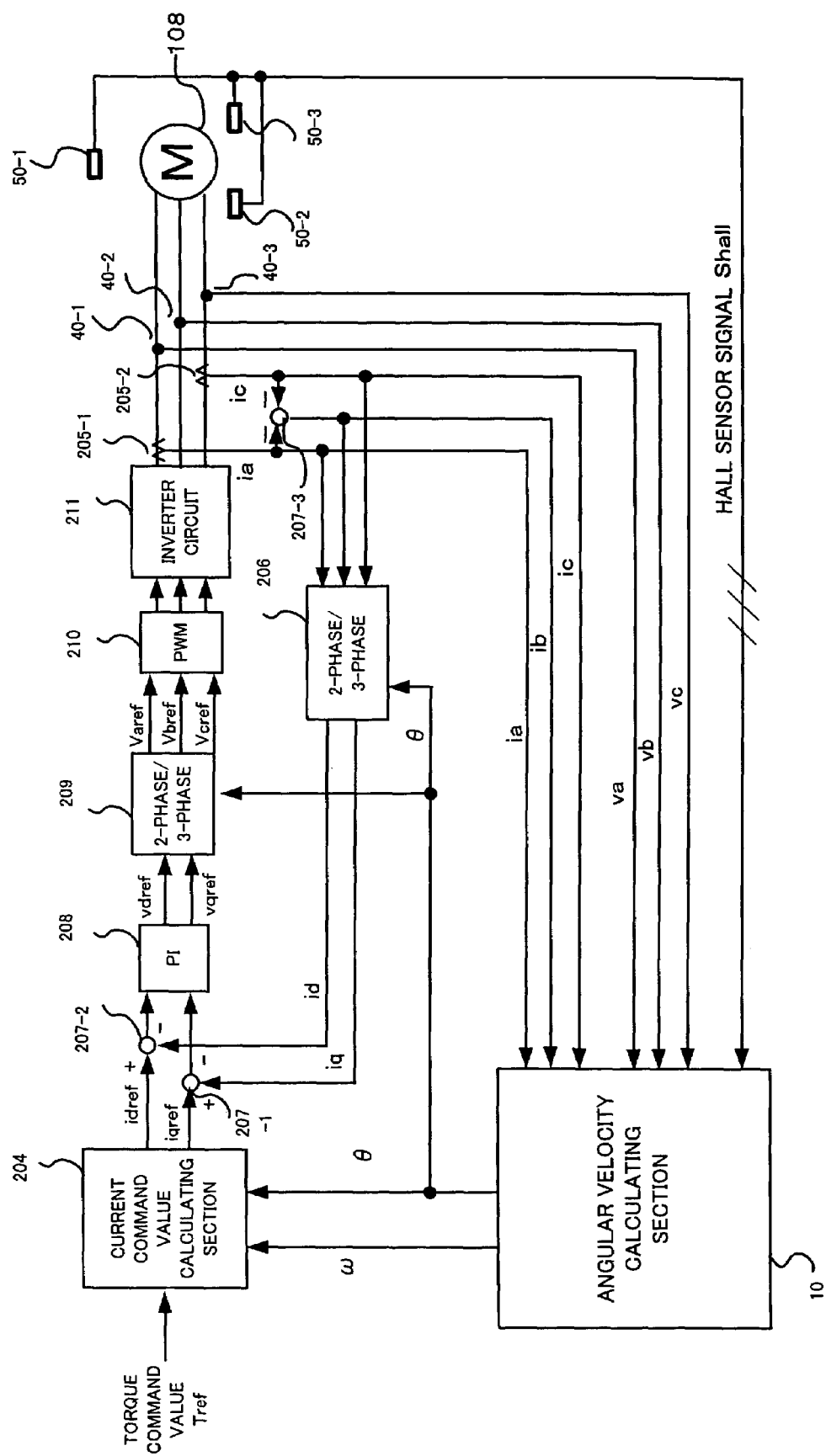
FIG. 6 is a block diagram of a control apparatus of an electric power steering apparatus according to the present invention.

FIG. 6 shows a basic control block diagram of the present invention. A block having the same reference numerical as the numerical explained in the control block diagram shown in FIG. 2 has the same function. What is different between the control block diagram of the present invention and the conventional control block diagram shown in FIG. 2 is that although the prior art employs a resolver which is an expensive angle detector, having a high precision, the present invention uses a cheap Hall sensor instead of the resolver although its precision is relatively lower. As an embodiment of the present invention, the motor 108 is a three-phase brushless DC motor and Hall sensors 50-1, 50-2, 50-3 are disposed around the rotor of the motor 108 so that an electric angle of 60° can be detected.

Since the present invention needs to calculate the back-EMF, voltage detectors 40-1, 40-2, 40-3 are disposed at input side of the motor 108 to measure voltages Va, Vb, Vc. With motor currents ia, ib, ic, voltages Va, Vb, Vc and a Hall sensor signal Shall from the Hall sensors 50-1, 50-2, 50-3 as inputs, the angular velocity calculating section 10 calculates the angular velocity ωe and the rotation angle θ, which are an object of the present invention.

In the meantime, the electric angles detected from the Hall sensors 50-1, 50-2, 50-3 are electric angle θo=0°, 60°, 120°, 180°, 240°, 300°. The installation positions of the Hall sensors for the initial value θi in the numerical formula 9 for calculating the rotation angle θ and an electric angle θo used for resetting calculation errors are permitted to be not 0°, for example, if the Hall sensor 50-1 is installed at a position of 30°, the electric angle θo is 30°, 90°, 150°, 210°, 330°.

Figure 7:
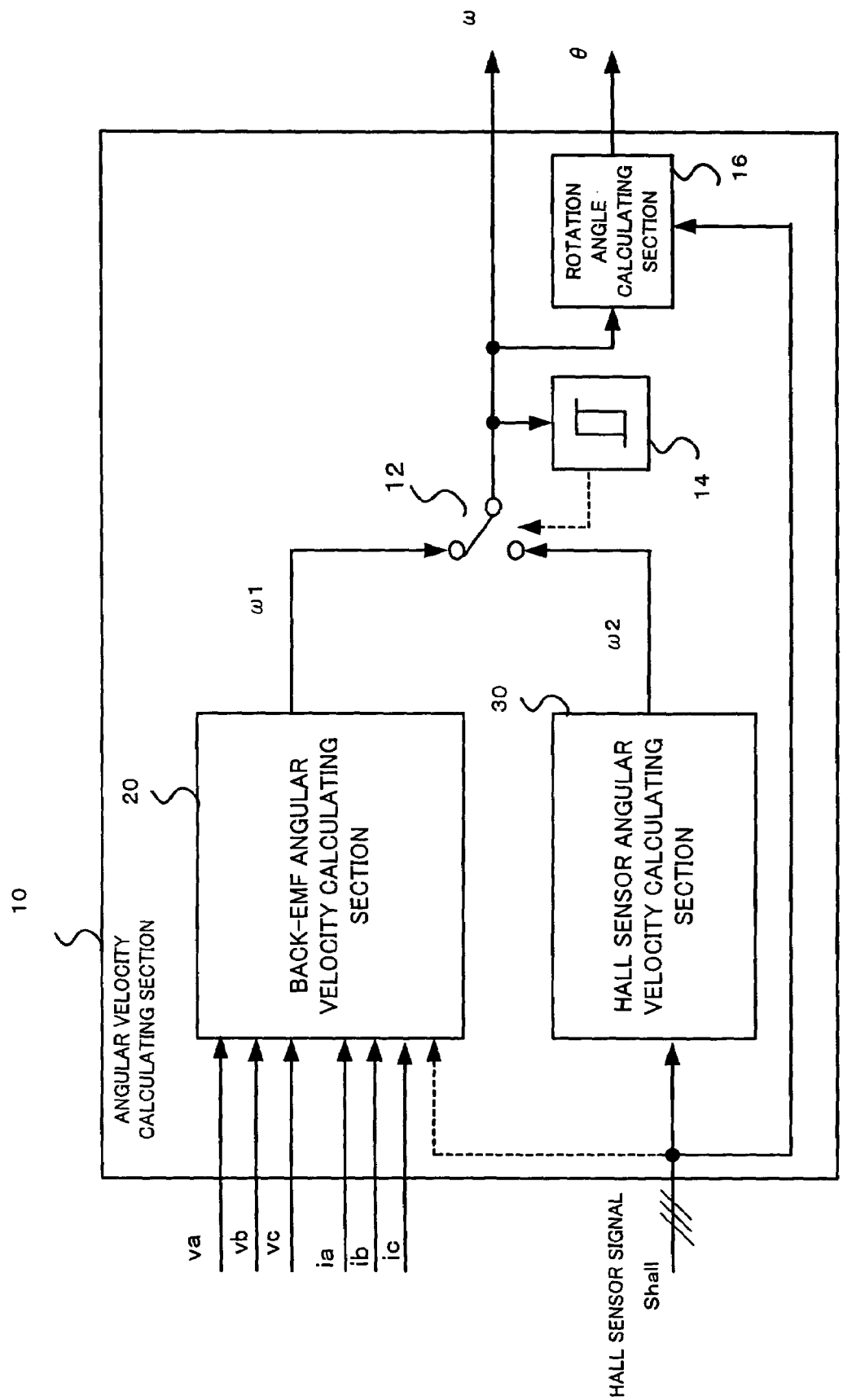
FIG. 7 is a block diagram of the angular velocity calculating section having a hybrid structure according to the embodiment of the present invention.

The internal detailed diagram of the angular velocity calculating section 10 is shown in FIG. 7. The angular velocity calculating section 10 basically comprises an back-EMF angular velocity calculating section 20 for calculating an angular velocity ω1 using an back-EMF, which is a first angular velocity detecting means, a Hall sensor angular velocity calculating section 30 for calculating an angular velocity ω2 using a Hall sensor signal Shall, which is a second angular velocity detecting means, and a selecting section 12 as a selecting means for selecting any of the angular velocity ω1 and the angular velocity ω2 as an angular velocity ω of the angular velocity calculating section 10 with respect to a predetermined rotation velocity.

Since the back-EMF angular velocity calculating section 20 is capable of calculating the angular velocity accurately at a low speed and the Hall sensor angular velocity calculating section 30 is capable of calculating the angular velocity accurately at a high speed, with respect to a predetermined rotation speed N (where N=60·2π·ωe[rpm]), for example, a predetermined rotation speed N of 1500 rpm, the selecting section 12 selects an angular velocity ω2 as the angular velocity ωe if it is higher than the rotation speed N and if it is lower, selects the angular velocity ω1. This will be explained in detail later.

When the rotation speed of the motor is near 1500 rpm, the selecting section 20 is switched frequently and alternately selects the angular velocities ω1 and ω2 so that it is not stabilized, the selecting section 20 is provided with a hysteresis section 14 to provide with hysteresis characteristic. With the angular velocity ωe which is an output of the selecting section 20 as an input, the hysteresis section 14 controls the selecting section 20 with such a hysteresis characteristic that it is switched at 1600 rpm when the rotation advances to high speeds and it is switched at 1400 rpm when the rotation advances to low speeds.

Further, the rotation angle calculating section 16 calculates and outputs a rotation angle θ according to the numerical formula 9 with the angular velocity ωe which is an output of the selecting section 20 and a Hall sensor signal Shall as inputs. In the meantime, the rotation angle θ calculated from the angular velocity ω1 is assumed to be "θ1" and the rotation angle calculated from the angular velocity ω2 assumed to be "θ2". Although the rotation angle θ is calculated from the angular velocity ωe which is outputted by the selecting section 20, it is permissible to dispose the rotation angle calculating section 16 inside the back-EMF angular velocity calculating section 20 and the Hall sensor angular velocity detecting section 30 and then provide a new selecting section for outputs of the back-EMF angular velocity calculating section 20 and the Hall sensor angular velocity detecting section 30 so as to select the rotation angles θ1 and θ2. The basic structure and operation of the angular velocity calculating section 10 have been described above.

Next, the back-EMF angular velocity calculating section 20 and the Hall sensor angular velocity calculating section will be described in detail.

Figure 8:
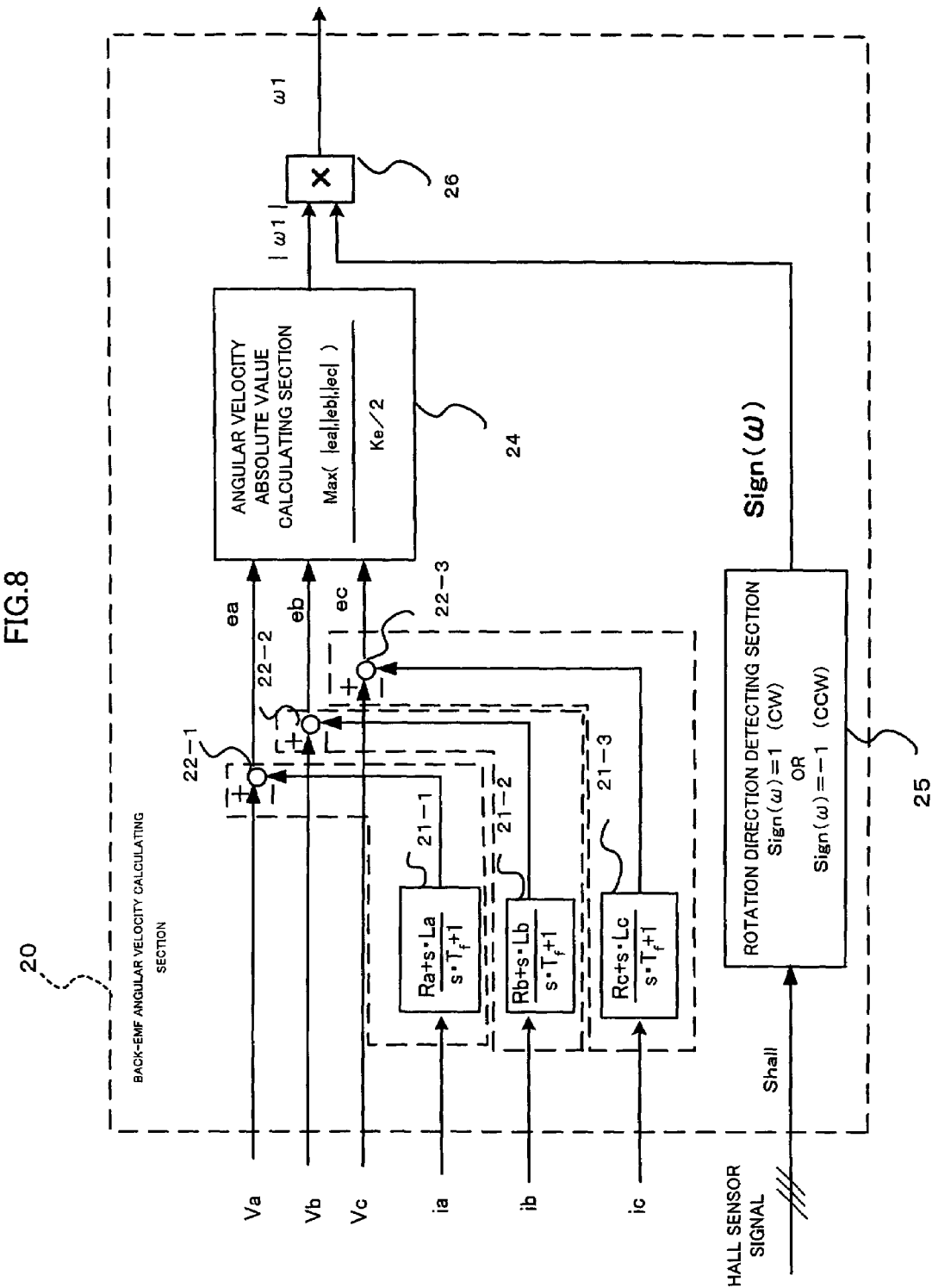
FIG. 8 is an internal detailed diagram of an angular velocity calculating section with back-EMF.

The internal detailed diagram of the back-EMF angular velocity calculating section 20 is shown in FIG. 8. The back-EMF angular velocity calculating section 20 shown in FIG. 8 calculates the angular velocity ω1 based on the numerical formulas 3 and 4. An embodiment for calculating based on the numerical formula 5 will be described later. The motor currents ia, ib, ic, the voltages Va, Vb, Vc and the Hall sensor signal Shall are inputted to the back-EMF angular velocity calculating section 20.

First, based on the numerical formula 1, the motor current ia of phase a is inputted to a transfer function 21-1 in order to calculate the back-EMF ea of the phase "a". The denominator of the transfer function 21-1 has a delay function which does not exist in the numerical formula 1 of (1+s·Tf). This is a necessary filter for realizing the equation "Ra+ s·La" to estimate the back-EMF. The angular velocity calculation in which the filter which is a delay function uses back-EMF is a cause of dropping the accuracy under high speed rotation.

Next, based on the numerical formula 1, the motor voltage Va and an output of the transfer function section 21-1 are inputted to a subtracting section 22-1 and the back-EMF ea of the phase "a" is outputted to the subtracting section 22-1. Likewise, to calculate the back-EMF eb of the phase "b", the motor current ib is inputted to the transfer function section 21-2, the motor voltage Vb and an output of the transfer function section 21-2 are inputted to the subtracting section 22-2 and the back-EMF eb is outputted to the subtracting section 21-2. Likewise, to calculate the back-EMF ec of the phase "c", the motor current ic is inputted to the transfer function section 21-3, the motor voltage Vc and an output of the transfer function section 21-3 are inputted to the subtracting section 22-3 and the back-EMF ec is outputted to the subtracting section 21-3.

Further, based on the numerical formula 3, the back-EMFs ea, eb, ec are inputted to the angular velocity absolute value calculating section 24 to calculate the angular velocity absolute value |ωe| which is a magnitude of the angular velocity. Next to execute the numerical formula 4, the Hall sensor signal Shall is inputted to the rotation direction detecting section 25 and the rotation direction of the motor is detected as sign(ωe). sign(ωe)=1 indicates clockwise direction (CW) and sign(ωe)=−1 indicates counterclockwise direction (CCW). Finally, the magnitude |ωe| and rotation direction sign (ωe) of the angular velocity which are outputs of the angular velocity absolute value calculating section 24 are inputted to the multiplying section 26 and the angular velocity ω1 (ω1 =|ω1|·(sign(ωe)) is outputted. As described above, the back-EMF angular velocity calculating section 20 which is the first angular velocity calculating means has such a feature that its precision is dropped under high speed rotation due to an influence of the delay function.

Figure 9:
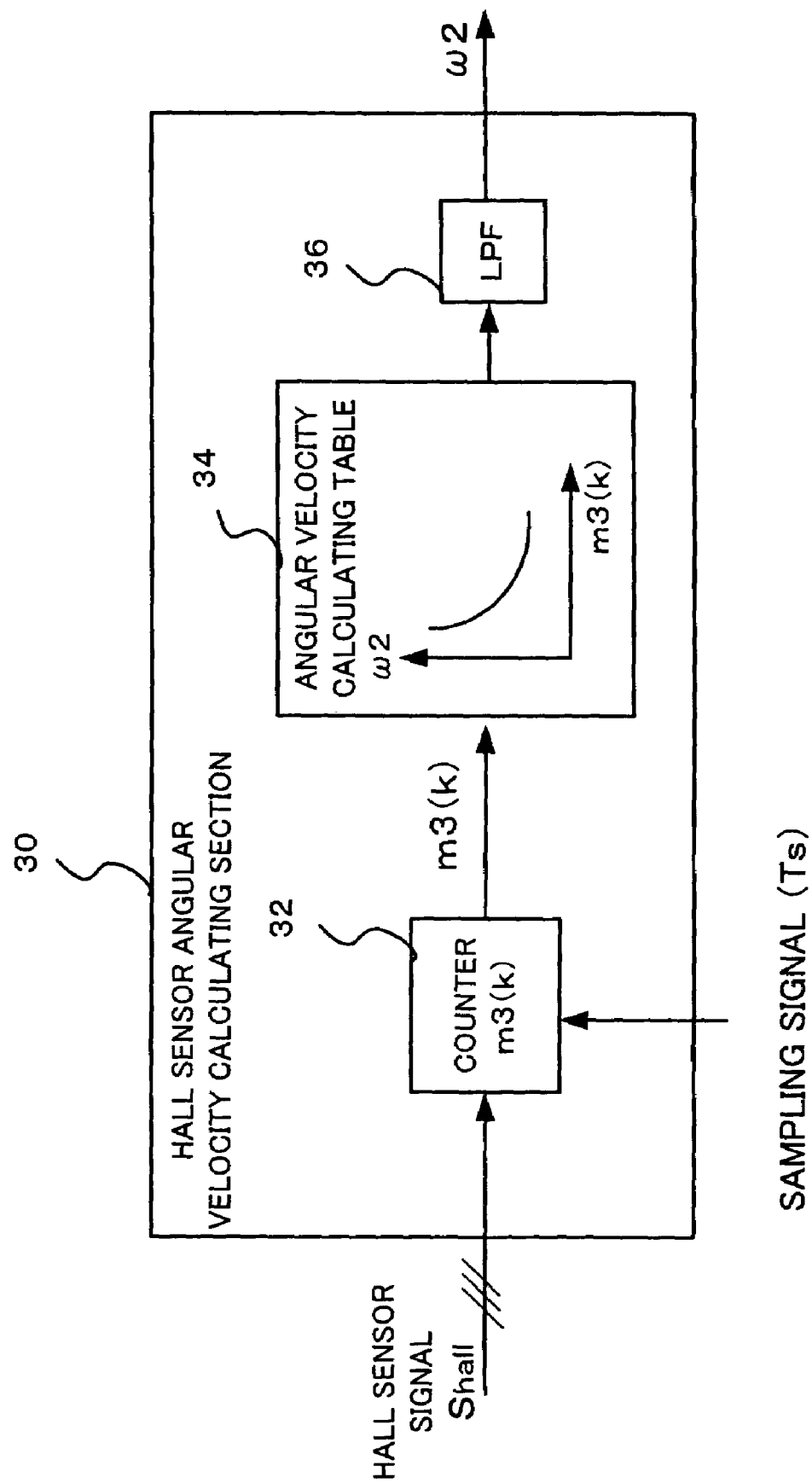
FIG. 9 is an internal detailed diagram of the angular velocity calculating section with the Hall sensor.

Furthermore, the Hall sensor angular velocity calculating section 30 which is a second angular velocity calculating means will be described with reference to FIG. 9. This calculation principle is based on the numerical formula 7. The Hall sensor signal Shall and a sampling signal (time interval Ts) of a micro computer or the like (not shown) are inputted to the Hall sensor angular velocity calculating section 30. The counter 32 counts the Hall sensor signals of four times, that is, number m3(k) of the sampling signals of three intervals as shown in FIG. 5, using the Hall sensor signal at the time of detection and plural Hall sensor signals before the detection time.

If the number m3(k) of the sampling signal can be counted, the time T can be calculated as "T=m3(k)·Ts". In this case, although the calculation may be executed, the angular velocity ω2 can be calculated directly using an angular velocity calculating table 34 as shown in FIG. 9. According to this embodiment, the angular velocity ω2 is calculated according to the numerical formula, more detail to the numerical formula 8. In the meantime, a low pass filter (LPF) 36 is disposed for an output of the angular velocity calculating table 34 in order to absorb noise of the angular velocity ω2 outputted from the angular velocity calculating table 34 although it is not a basic component.

Since the angular velocity calculation with the Hall sensor angular velocity calculating section 30 which is a second angular velocity calculating means can use the Hall sensor signal per apparatus time better as the rotation speed increases, its accuracy is enhanced as the rotation speed increases.

Since the accuracies of the angular velocities ω1 and ω2 exchange when the rotation number of the motor reaches about 1500 rpm which is a predetermined rotation number, as described previously, the accuracy of the angular velocity ω1 calculated by the back-EMF angular velocity calculating section 20 is excellent below 1500 rpm and thus, outputted as an output of the angular velocity ω of the angular velocity calculating section 10. Because the accuracy of the angular velocity ω2 calculated by the Hall sensor angular velocity calculating section 30 is better above 1500 rpm, it is outputted as the angular velocity ωe of the angular velocity calculating section 10. In the meantime, when the selecting section 12 has hysteresis characteristic, it is not carried out at 1500 rpm, that is, the angular velocities ω1 and ω2 are selected at 1600 rpm when the rotation increases and at 1400 rpm when the rotation decreases.

Thus, according to the present invention, a highly accurate angular velocity ωe can be detected under all rotation speeds using a position detector having a similar accuracy to the Hall sensor and at the same time, a highly accurate rotation angle θe can be detected.

Embodiment-2

The principle of the angular velocity calculation using the back-EMF can be employed for calculation based on the numerical formula 5 as well as the numerical formulas 3 and 4 (if the motor is driven by 3-phase rectangular current). In case of the numerical formula 5, not only the magnitude of the angular velocity is calculated but also the magnitude of the angular velocity and the rotation direction are calculated at the same time.

Figure 10:
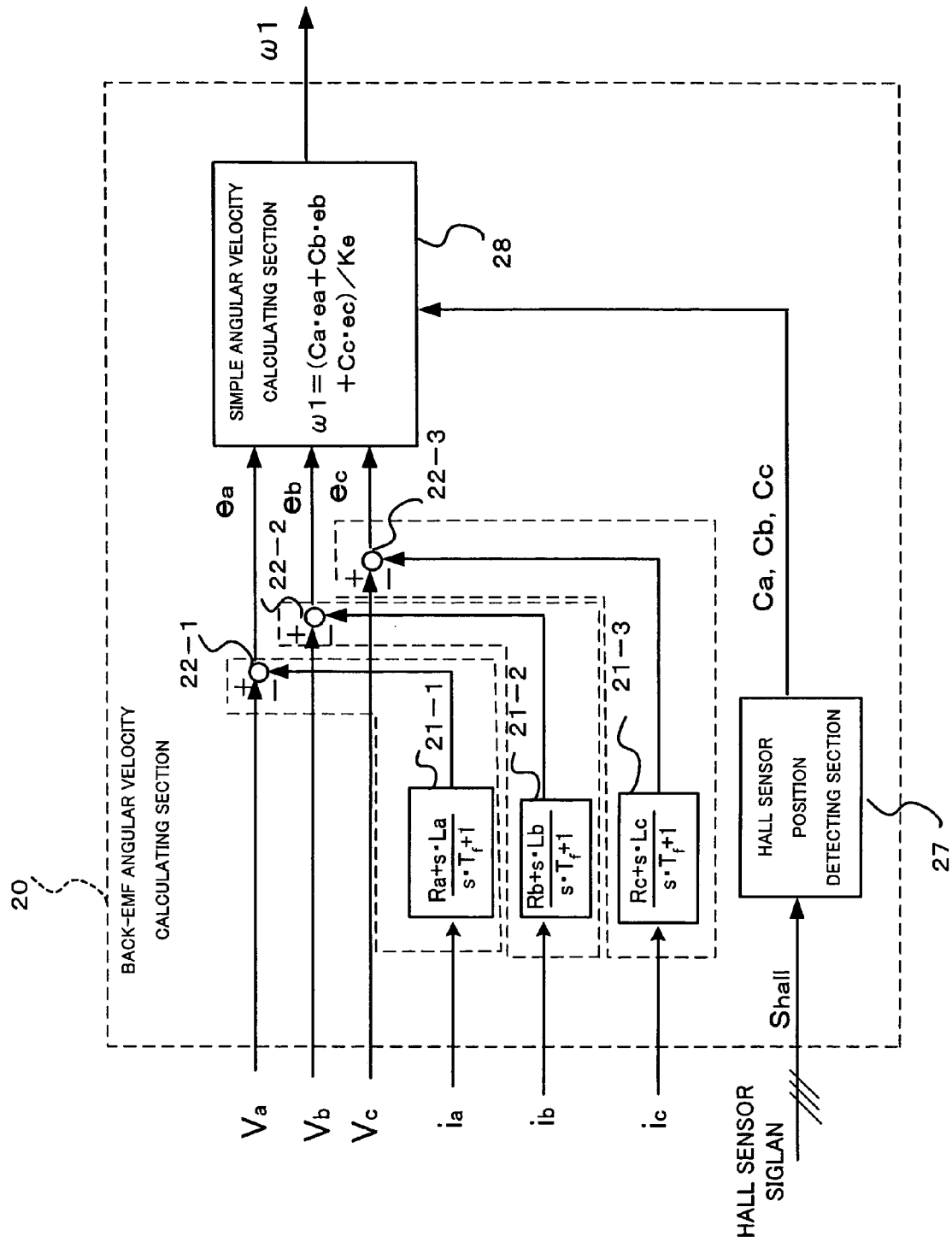
FIG. 10 is an internal detailed diagram of the angular velocity calculating section with back-EMF of other embodiment according to the present invention.

Hereinafter, an example of the back-EMF angular velocity calculating section 20 based on the numerical formula 5 will be described with reference to FIG. 10. Since the element shaving the same reference numerical as the elements described in FIG. 8 of the first embodiment-1 have the same function, description thereof is omitted. What is different is that the Hall sensor signal Shall is inputted to the Hall sensor position detecting section 27 and "1", "0", "−1" are allocated to the commutation signals Ca, Cb, Cc. Then, based on the numerical formula 5, the back-EMFs ea, eb, ec and the commutation signals Ca, Cb, Cc are inputted to a simple angular velocity calculating section 28 and the calculation is performed based on the numerical formula 5 to calculate the angular velocity ω1. The other elements of the present invention are the same as the first embodiment-1. Under this embodiment also, the effect of the present invention can be expected.

Although under the first embodiment-1, the case of the 3-phase brushless motor has been described, the present invention can be applied to multi-phase brushless motor such as 5-phase or 7-phase.

Further, although the present invention has been described about an example of the electric power steering apparatus, it can be applied to general machinery using the motor drive apparatus.

As described above, the present invention enables the angular velocity ω to be detected at excellent precision under all the rotation speeds by using the position detector having an accuracy similar to the Hall sensor and at the same time, the present invention can be applied to the motor drive apparatus capable of detecting a rotation angle θ at an excellent precision and an electric power steering apparatus provided with the same.

According to the present invention, when the motor rotates at high speeds, a multiplicity of the Hall sensor signals can be obtained per apparatus time. Consequently, the angular velocity ω1 and the rotation angle θ1 can be detected accurately using the Hall sensor signal. When the motor rotates at low speeds, the angular velocity ω2 and the rotation angle θ2 can be detected accurately using the back-EMF of the motor instead of the Hall sensor and further, by using a selecting means which is switched depending on the rotation speed, highly accurate angular velocity and rotation angle can be selected from the angular velocity ω1 or ω2 and the rotation speed θ1 or θ2 which accuracy depends on the rotation speed, and therefore, highly accurate angular velocity and rotation angle can be detected from its entire speed range from the low speed rotation to the high speed rotation of the motor.

What is claimed is:

1. A motor drive apparatus comprising:
a first angular velocity calculating means for calculating an angular velocity ω1 of a brushless motor using a back-EMF of said brushless motor; a second angular velocity calculating means for calculating an angular velocity ω2 of said brushless motor using signals of plural Hall sensors disposed in said brushless motor; and a selecting means which when a rotation speed of said brushless motor is lower than a predetermined rotation speed, selects an angular velocity ω1 calculated by said first angular velocity calculating means and when the rotation speed of said brushless motor is higher than said predetermined rotation speed, selects an angular velocity ω2 calculated by said second angular velocity calculating means,
wherein said second angular velocity calculating means calculates said angular velocity ω2 using a signal of said Hall sensor at a time of calculation and a signal of plural Hall sensors before the calculation time.

2. A motor drive apparatus comprising:
a first angular velocity calculating means for calculating an angular velocity ω1 of a brushless motor using a back-EME of said brushless motor; a second angular velocity calculating means for calculating an angular velocity ω2 of said brushless motor using signals of plural Hall sensors disposed in said brushless motor; and a selecting means which when a rotation speed of said brushless motor is lower than a predetermined rotation speed, selects an angular velocity ω1 calculated by said first angular velocity calculating means and when the rotation speed of said brushless motor is higher than said predetermined rotation speed, selects an angular velocity ω2 calculated by said second angular velocity calculating means,
wherein said first angular velocity calculating means calculates a magnitude of said angular velocity ω1 using back-EMFs calculated by voltage and current of said brushless motor,
said first angular velocity calculating means comprising a voltage drop calculating section for calculating a voltage drop of a motor electrical characteristic based on said current, subtracting sections for obtaining deviations between said voltage and said voltage drop on the corresponding windings, an angular velocity absolute value calculating section for calculating an angular velocity absolute value based on outputs of said subtracting sections, a direction detecting section for detecting a rotational direction based on said signal of Hall sensor and a multiplier for multiplying said angular velocity absolute value with said rotational direction.

3. A motor drive apparatus comprising
a first angular velocity calculating means for calculating an angular velocity ω1 of a brushless motor using a back-EMF of said brushless motor: a second angular velocity calculating means for calculating an angular velocity ω2 of said brushless motor using signals of plural Hall sensors disposed in said brushless motor: and a selecting means which when a rotation speed of said brushless motor is lower than a predetermined rotation speed, selects an angular velocity ω1 calculated by said first angular velocity calculating means and when the rotation speed of said brushless motor is higher than said predetermined rotation speed, selects an angular velocity $\omega 2$ calculated by said second angular velocity calculating means, wherein said second angular velocity calculating means calculates said angular velocity $\omega 2$ using a signal of said Hall sensor at a time of calculation and a signal of plural Hall sensors before the calculation time, said second angular velocity calculating means comprising a counter for counting number of sampling signals corresponding to plural Hall sensor signals at a calculating time and passed times before the calculating time, an angular velocity calculating table for calculating an angular velocity based on an output of said counter.

4. A motor drive apparatus comprising:

a first angular velocity calculating means for calculating an angular velocity $\omega 1$ of a brushless motor using a back-EMIF of said brushless motor; a second angular velocity calculating means for calculating an angular velocity $\omega 2$ of said brushless motor using signals of plural Hall sensors disposed in said brushless motor; and a selecting means which when a rotation speed of said brushless motor is lower than a predetermined rotation speed, selects an angular velocity $\omega 1$ calculated by said first angular velocity calculating means and when the rotation speed of said brushless motor is higher than said predetermined rotation speed, selects an angular velocity $\omega 2$ calculated by said second angular velocity calculating means, wherein said second angular velocity calculating means calculates said angular velocity $\omega 2$ using a signal of said Hall sensor at a time of calculation and a signal of plural Hall sensors before the calculation time, said second angular velocity calculating means comprising a counter for counting number of sampling signals corresponding to plural Hall sensor signals at a calculating time and passed times before the calculating time, an angular velocity calculating table for calculating an angular velocity based on an output of said counter, a low pass filter is provided at an output side of said angular velocity calculating table.

5. An electric power steering apparatus provided with the motor drive apparatus according to any one of claims 2, 3 and 4.

6. A motor drive apparatus comprising:

a first angular velocity calculating means for calculating an angular velocity $\omega 1$ of a brushless motor using a back-EMF of said brushless motor; a second angular velocity calculating means for calculating an angular velocity $\omega 2$ of said brushless motor using signals of plural Hall sensors disposed in said brushless motor; and a selecting means which when a rotation speed of said brushless motor is lower than a predetermined rotation speed, selects an angular velocity $\omega 1$ calculated by said first angular velocity calculating means and when the rotation speed of said brushless motor is higher than said predetermined rotation speed, selects an angular velocity $\omega 2$ calculated by said second angular velocity calculating means, wherein said second angular velocity calculating means calculates said angular velocity $\omega 2$ using a signal of said Hall sensor at a time of calculation and a signal of plural Hall sensors before the calculation time, said selecting means selects said angular velocity $\omega 1$ or said angular velocity $\omega 2$ based on a predetermined rotation speed having a hysteresis characteristic.

7. An electric power steering apparatus provided with the motor drive apparatus according to claim 6.

* * * * *